US012061364B2

United States Patent
Cloud et al.

(10) Patent No.: US 12,061,364 B2
(45) Date of Patent: Aug. 13, 2024

(54) FERRULE PUSH

(71) Applicant: US Conec, Ltd, Hickory, NC (US)

(72) Inventors: Mitchell Cloud, Hickory, NC (US);
Craig M. Conrad, Hickory, NC (US);
Jason Higley, Hickory, NC (US);
Darrell R. Childers, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 0 days.

(21) Appl. No.: 17/688,764

(22) Filed: Mar. 7, 2022

(65) Prior Publication Data
US 2022/0196922 A1    Jun. 23, 2022

Related U.S. Application Data

(62) Division of application No. 17/251,076, filed as application No. PCT/US2020/051162 on Sep. 17, 2020, now Pat. No. 11,280,966.

(60) Provisional application No. 62/901,636, filed on Sep. 17, 2019.

(51) Int. Cl.
*G02B 6/38* (2006.01)
(52) U.S. Cl.
CPC ......... *G02B 6/3831* (2013.01); *G02B 6/3825* (2013.01); *G02B 6/3893* (2013.01)
(58) Field of Classification Search
CPC .. G02B 6/3831; G02B 6/3825; G02B 6/3893; G02B 6/38
USPC .......................................................... 385/14
See application file for complete search history.

(56) References Cited

U.S. PATENT DOCUMENTS

| | | | | |
|---|---|---|---|---|
| 5,734,558 A | * | 3/1998 | Poplawski | G02B 6/4277 361/752 |
| 6,019,521 A | * | 2/2000 | Manning | G02B 6/3888 385/76 |
| 6,079,881 A | * | 6/2000 | Roth | G02B 6/3869 385/139 |
| 6,086,263 A | * | 7/2000 | Selli | B08B 11/00 385/83 |

(Continued)

FOREIGN PATENT DOCUMENTS

| CN | 106483604 A | 3/2017 |
|---|---|---|
| CN | 109407218 A | 3/2019 |

(Continued)

OTHER PUBLICATIONS

International Search Report and Written Opinion of the Searching Authority, PCT/US2020/051162, dated Dec. 29, 2020.

(Continued)

*Primary Examiner* — Kaveh C Kianni
(74) *Attorney, Agent, or Firm* — Michael L. Leetzow PLLC; Shubhrangshu Sengupta

(57) ABSTRACT

A fiber optic ferrule push includes a main body extending between a front end and a rear end, the main body having a central opening extending between the front end and the rear end to receive a plurality of optical fibers therethrough, a front facing surface configured to engage a rear surface of a fiber optic ferrule, and at least one projection extending outward from the main body to engage a housing configured to receive the fiber optic ferrule, the fiber optic ferrule push may also include a key extending outward from a surface of the main body. The fiber optic ferrule push may be paired with a fiber optic ferrule in a fiber optic assembly.

13 Claims, 17 Drawing Sheets

(56) References Cited

U.S. PATENT DOCUMENTS

| | | | |
|---|---|---|---|
| 6,224,268 B1* | 5/2001 | Manning | G02B 6/3888 385/76 |
| 6,454,464 B1 | 9/2002 | Nolan | |
| 6,513,989 B1* | 2/2003 | Bleck | G02B 6/3897 385/60 |
| 7,296,935 B1 | 11/2007 | Childers et al. | |
| 7,609,925 B2 | 10/2009 | Gronvall et al. | |
| 7,762,726 B2* | 7/2010 | Lu | G02B 6/3816 385/53 |
| 8,104,973 B2 | 1/2012 | Howard et al. | |
| 8,920,043 B2 | 12/2014 | Iwaya et al. | |
| 9,057,845 B2 | 6/2015 | Szilagyi et al. | |
| 10,215,926 B2 | 2/2019 | Ott | |
| 10,451,830 B2 | 10/2019 | Szumacher et al. | |
| 10,670,814 B2 | 6/2020 | Morishima et al. | |
| 10,678,012 B1* | 6/2020 | Wu | G02B 6/447 |
| 11,016,250 B2 | 5/2021 | Higley et al. | |
| 11,150,412 B2* | 10/2021 | Zimmel | G02B 6/3656 |
| 2001/0026661 A1* | 10/2001 | de Jong | G02B 6/3831 385/56 |
| 2003/0012520 A1* | 1/2003 | Rogge | G02B 6/4292 385/88 |
| 2004/0017983 A1 | 1/2004 | Chen et al. | |
| 2008/0260333 A1 | 10/2008 | Roth | |
| 2008/0273840 A1* | 11/2008 | Lu | G02B 6/3831 385/72 |
| 2008/0279508 A1* | 11/2008 | Fukui | G02B 6/3885 385/72 |
| 2009/0003772 A1* | 1/2009 | Lu | G02B 6/3897 385/60 |
| 2009/0046981 A1* | 2/2009 | Margolin | G02B 6/3825 385/70 |
| 2009/0220227 A1* | 9/2009 | Wong | G02B 6/3878 398/41 |
| 2010/0266245 A1* | 10/2010 | Sabo | G02B 6/3839 385/79 |
| 2012/0027359 A1* | 2/2012 | Katoh | G02B 6/3897 385/78 |
| 2014/0023326 A1* | 1/2014 | Anderson | G02B 6/3895 385/77 |
| 2014/0205244 A1 | 7/2014 | Bradley | |
| 2015/0355417 A1 | 12/2015 | Takano et al. | |
| 2016/0124150 A1* | 5/2016 | James | G02B 6/3616 264/1.27 |
| 2017/0184800 A1* | 6/2017 | de Jong | G02B 6/3825 |
| 2017/0192180 A1* | 7/2017 | Andrus | G02B 6/3821 |
| 2018/0003910 A1 | 1/2018 | Menguy | |
| 2018/0259720 A1* | 9/2018 | Brown | B08B 3/02 |
| 2018/0329150 A1* | 11/2018 | Chang | G02B 6/3849 |
| 2018/0348447 A1* | 12/2018 | Nhep | G02B 6/38875 |
| 2019/0018201 A1* | 1/2019 | Takano | G02B 6/3825 |
| 2019/0064447 A1* | 2/2019 | Chang | G02B 6/3825 |
| 2019/0137700 A1* | 5/2019 | Takano | G02B 6/3893 |
| 2019/0154930 A1* | 5/2019 | Ho | G02B 6/4256 |
| 2019/0250344 A1 | 8/2019 | Takano et al. | |
| 2020/0064564 A1* | 2/2020 | Ho | G02B 6/3887 |
| 2020/0183097 A1* | 6/2020 | Chang | G02B 6/3831 |
| 2020/0200977 A1 | 6/2020 | Nguyen et al. | |
| 2020/0257056 A1* | 8/2020 | Milchtein Peltsverger | G02B 6/3825 |
| 2020/0278502 A1* | 9/2020 | Van Baelen | G02B 6/3887 |
| 2020/0310049 A1* | 10/2020 | Chang | G02B 6/3885 |
| 2020/0333537 A1* | 10/2020 | Gniadek | G02B 6/3893 |
| 2021/0033796 A1* | 2/2021 | Zimmel | G02B 6/3851 |
| 2021/0080656 A1* | 3/2021 | Fujita | G02B 6/387 |
| 2021/0255407 A1 | 8/2021 | Coan et al. | |
| 2021/0325614 A1* | 10/2021 | Childers | G02B 6/3893 |
| 2022/0082763 A1 | 3/2022 | Verheyden et al. | |

FOREIGN PATENT DOCUMENTS

| | | |
|---|---|---|
| CN | 208737043 U | 4/2019 |
| WO | 2018119140 A1 | 6/2018 |
| WO | 2019010291 A1 | 1/2019 |
| WO | 2021055532 A1 | 3/2021 |

OTHER PUBLICATIONS

ISR/WO in PCT/US2021/026306 dated Jul. 30, 2021 (joint Applicant).
Extended European search report; 4 pages; Sep. 15, 2023.
Written Opinion European patent office; 4 pages; Sep. 5, 2023.

* cited by examiner

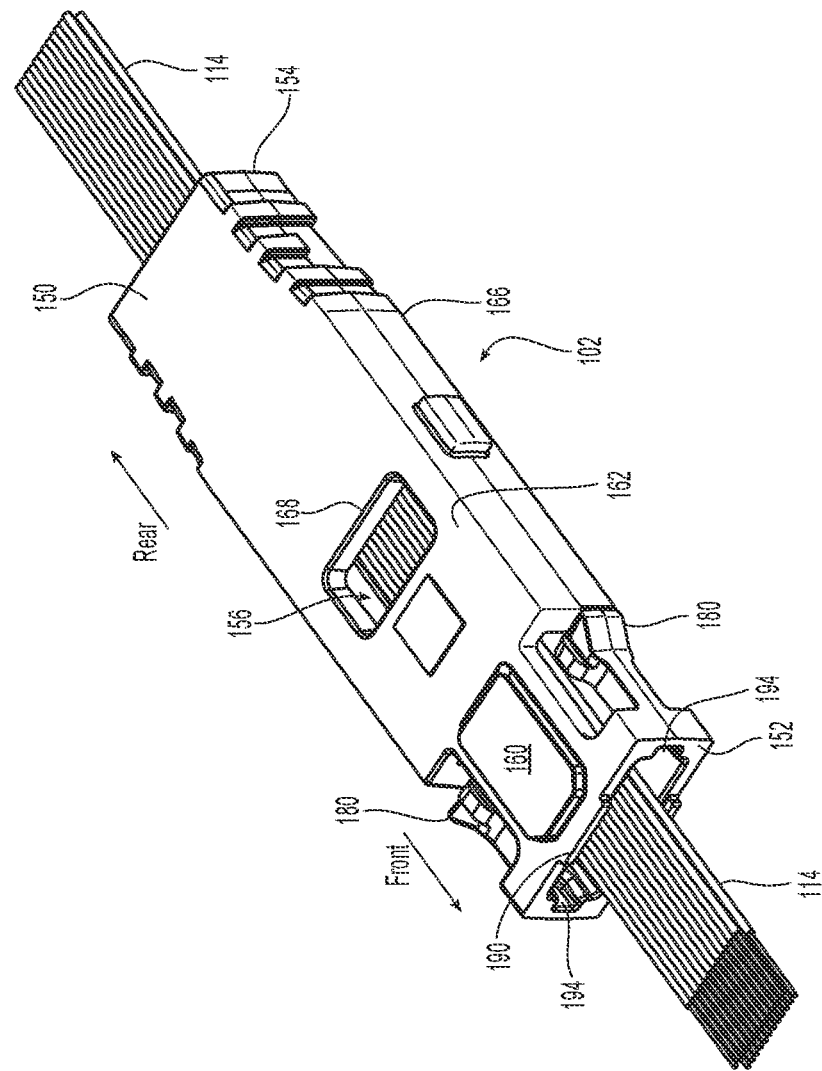
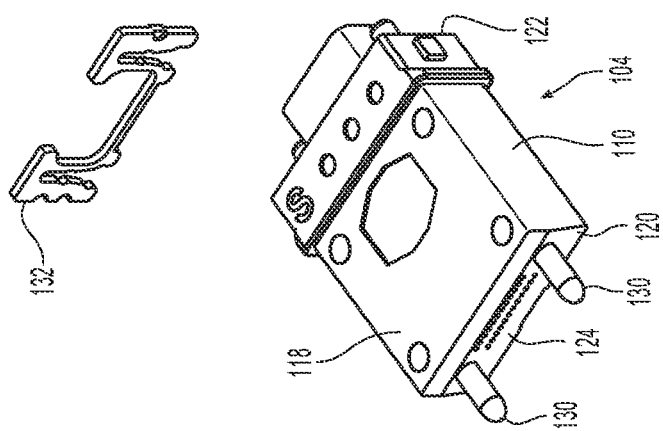
Fig. 2

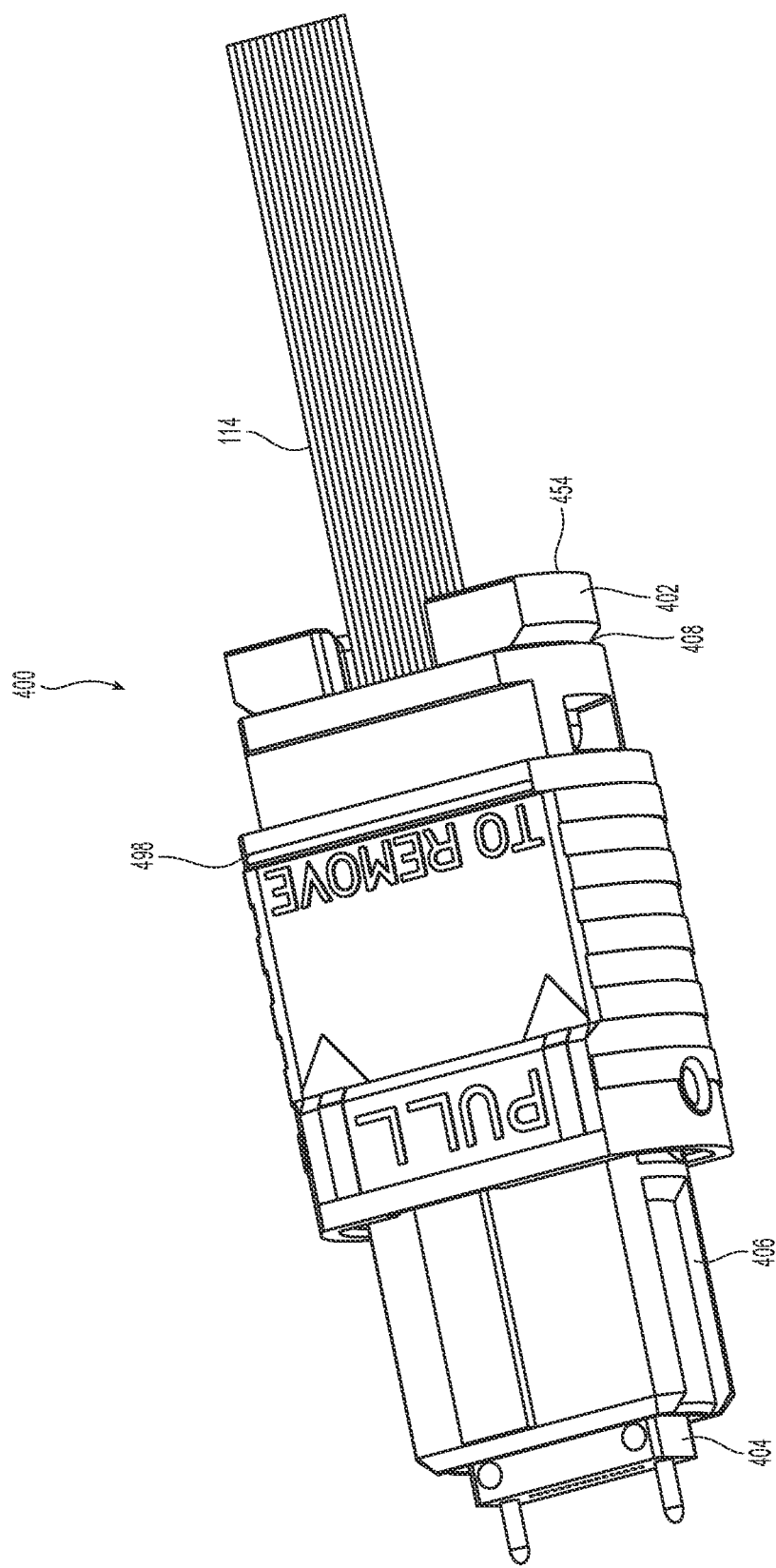

FERRULE PUSH

REFERENCE TO RELATED CASE

This application claims priority under 35 U.S.C. § 119 (e) to U.S. provisional application No. 62/901,636 filed on Sep. 17, 2019, and under 35 U.S.C. § 120 to U.S. application Ser. No. 17/251,076, filed on Dec. 10, 2020, the contents of which are hereby incorporated by reference in their entirety.

BACKGROUND OF THE INVENTION

In a data center environment, the routing of optical fibers between data centers usually requires the connection of thousands of optical fibers to connect one data center building to another. Such connections involve manually fusion splicing several thousands of optical fibers. The splicing is usually the last job before the connection of the data centers is complete. However, manually splicing optical fibers is time consuming and expensive due to the labor costs and equipment needed for the job. Thus, this job becomes the bottleneck for bring the new data centers on-line.

A solution to avoiding the fusion-splicing includes using pre-terminated MT ferrules in a pulling grip (or "pulling sock") attached to a jacketed cable between the two data-center buildings. Such a pulling grip is known in the art. Depending on how many fibers per fiber optic ferrule are present, the number of fiber optic ferrules inside the pulling grip will vary. For example, one pulling grip may accommodate a total of 3456 fibers in 288 fiber optic ferrules (i.e., each ferrule having 12 fibers). These fiber optic ferrules are then pulled out of the pulling grip at a designated spot inside the second data center building. Subsequently, an MT-MPO adapter, such as the one shown in U.S. Pat. No. 7,296,935 owned by the Applicant, may be used to connect an MT ferrule directly to an MPO style connector. One concern with this approach is that a technician/user at the data center will need to handle a bare, terminated fiber optic ferrule. This increases the chances of damage to the ferrule, especially since there are hundreds of such fiber optic ferrules that need to be inserted into MT-MPO adapters. Further, on the other side of the adapter, an MPO connector is typically already installed and when the bare fiber optic ferrule is installed with the optical fiber ribbon, subjecting the fiber optic ferrule to high forces (up to around 20 N). These forces make it a bit difficult to plug in the fiber optic ferrule. While the MT-MPO adapter solution is highly desirable in many other applications involving a relatively smaller number of connections, this solution, though feasible, is not optimal. An MPO-MPO adapter may alternatively be used. However, MPO connectors are larger and may not fit inside a cable or a pulling grip attached to the cable connecting two data centers due to their size. Further, the use of MPO connectors increases the footprint on the panel on which other connectors are placed.

Thus, there is a need for a solution to a bulky connector being pulled through conduits to connect the data centers.

SUMMARY OF THE INVENTION

The present invention is directed to a fiber optic ferrule push that includes a main body extending between a front end and a rear end, the main body having a central opening extending between the front end and the rear end to receive a plurality of optical fibers therethrough, a front facing surface configured to engage a rear surface of a fiber optic ferrule, at least one projection extending outward from the main body to engage a housing configured to receive the fiber optic ferrule, and a key extending outward from a surface of the main body.

In some embodiments, the front facing surface is a first front facing surface and the front end of the fiber optic ferrule push has a second front facing surface, the second front facing surface disposed parallel to and rearward of the first front facing surface.

In some embodiments, the front end has at least one receptacle to receive a portion of a guide pin disposed within a fiber optic ferrule associated with the fiber optic ferrule push.

In other embodiments, the main body has a slot in one surface, the slot extending from the front end to the rear end.

In yet another aspect, there is a fiber optic assembly that includes a fiber optic ferrule push and a fiber optic ferrule, the fiber optic ferrule push further includes a main body extending between a front end and a rear end, the main body having a central opening extending between the front end and the rear end to receive a plurality of optical fibers therethrough, a latch disposed on one of a housing and the main body, the latch to engage a surface on the other of the housing and the main body, a first alignment structure to engage a corresponding second alignment structure on the housing to align the fiber optic ferrule push to the housing, and a front facing surface configured to push on a rear surface of a fiber optic ferrule, and the fiber optic ferrule further includes a main body having a plurality of optical fiber support structures to receive the plurality of optical fibers, and a rear end having an opening to receive the plurality of optical fibers, wherein the opening is less than twice the diameter of the optical fibers inserted therein.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

BRIEF DESCRIPTION OF THE DRAWINGS

FIG. 2 is an enlarged top plan view of the fiber optic assembly in FIG. 1 without the housing;

FIG. 17 is a perspective view of the fiber optic assembly in FIG. 11 with a housing and a slidable sleeve;

DETAILED DESCRIPTION OF THE INVENTION

Figure 1:
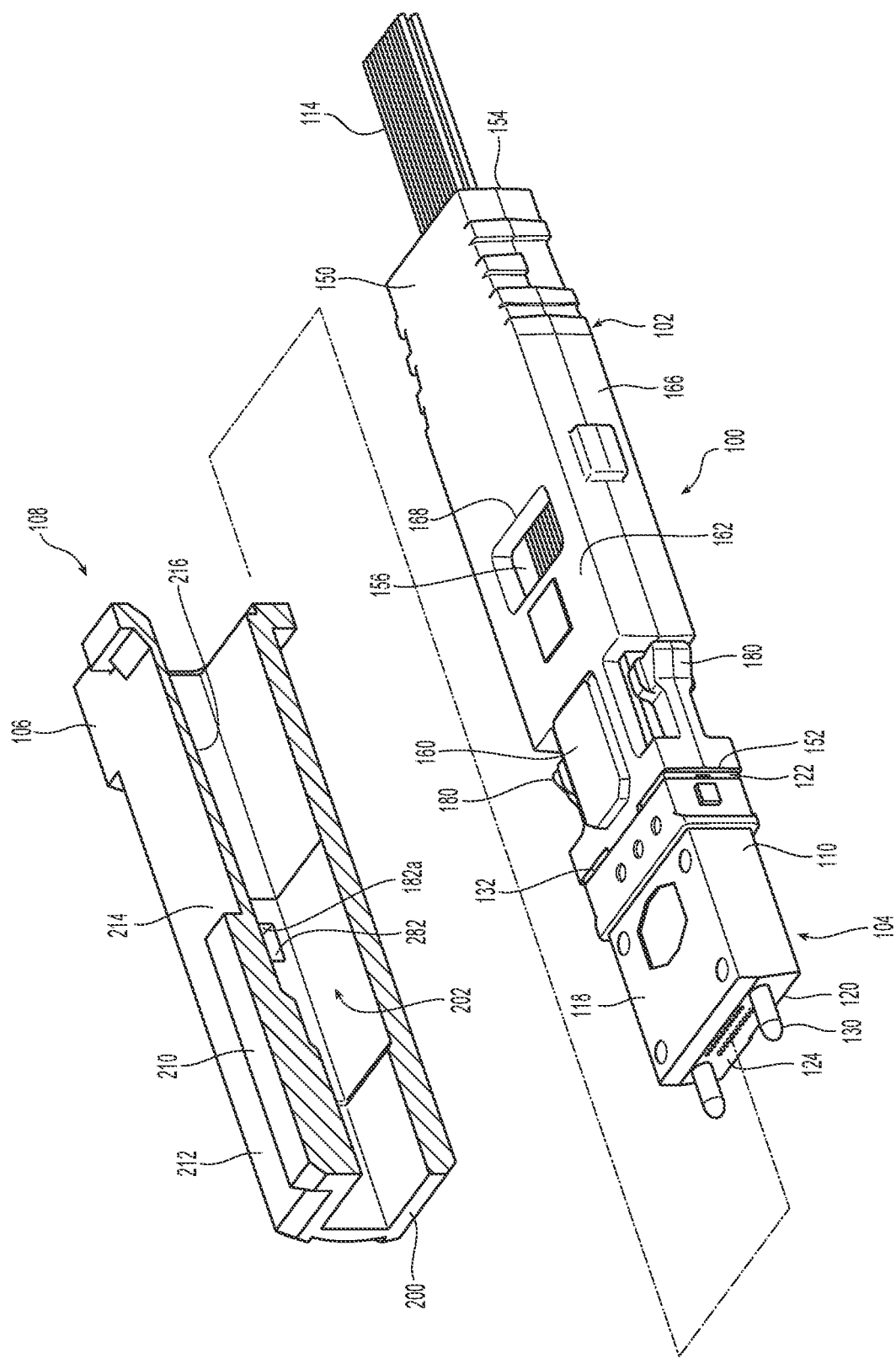
FIG. 1 is an exploded perspective view of one embodiment of a fiber optic assembly with a cross-section of a housing according to the present invention.
Figure 3:
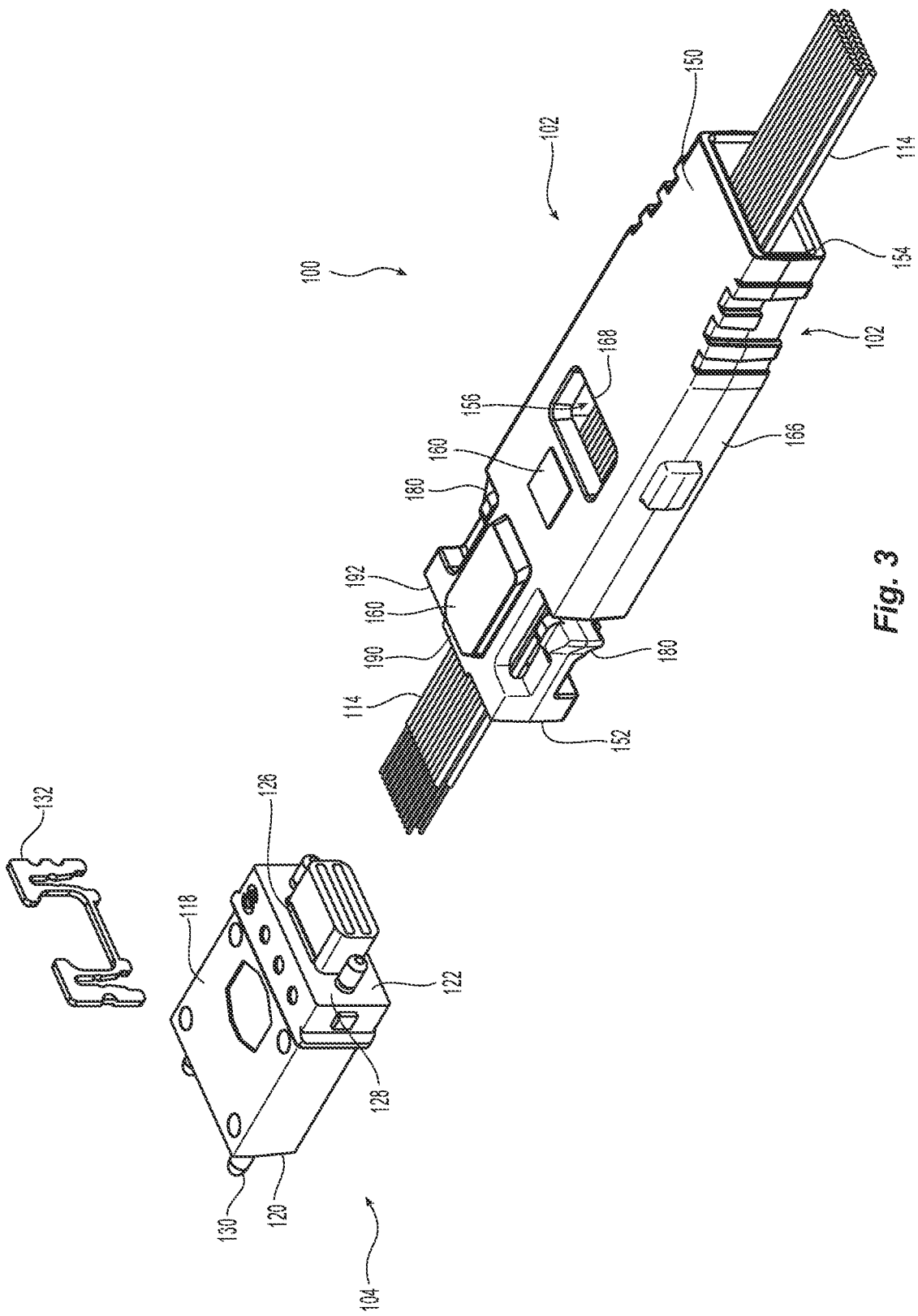
FIG. 3 is an exploded rear side perspective view of the fiber optic assembly in FIG. 1.

Reference will now be made in detail to the present preferred embodiment(s) of the invention, examples of which are illustrated in the accompanying drawings. Whenever possible, the same reference numerals will be used throughout the drawings to refer to the same or like parts.

Applicant notes that the term "front" or "forward" means that direction where the fiber optic connector and/or the ferrule would meet with another fiber optic connector or device, while the term "rear" or "rearward" is used to mean the direction from which the optical fibers enter into the fiber-optic ferrule or fiber optic connector. Each of the fiber optic ferrules will therefore have a front and rear, and the two fronts or forward portions of the fiber optic ferrules would engage one another. Thus, in FIG. 1, the "front" of the fiber optic ferrule is on the left side of FIG. 1 and "forward" is to the left and out of the page. "Rearward" or "back" is that part of the fiber optic connector that is on the right side of the page and "rearward" and "backward" is toward the right and into the page One embodiment of a fiber optic assembly 100 according to the present invention is illustrated in FIGS. 1-8. The fiber optic assembly 100 includes a fiber optic ferrule push 102 and a fiber optic ferrule 104. The fiber optic assembly 100 may also include the housing 106, illustrated in FIG. 1. As noted therein, the fiber optic ferrule push 102 and a fiber optic ferrule 104 may be inserted together into the housing 106 from a rear end 108. A discussion of the installation of the fiber optic assembly 100 is discussed below.

The fiber optic ferrule 104 may be an MT ferrule, which is generally known in the art. It may also take a number of other configurations, such as those illustrated in FIGS. 2, 3, and 9. However, the fiber optic ferrule 104 preferably has a main body 110 that includes a plurality of optical fiber support structures 112 (See also FIG. 6 and FIG. 9), which may be a plurality of micro-holes, v-grooves, or the like. The optical fiber support structures 112 support and hold the optical fibers 114 inserted into the fiber optic ferrule 104. The fiber optic ferrule 104 may also include a window (e.g. like the window in FIG. 9) in a top surface 118 of the fiber optic ferrule 104 to assist with the alignment of the optical fibers 114 and to receive epoxy to secure the optical fibers 114 therein. The main body 110 extends between a front end 120 and a rear end 122, the optical fibers 114 extending from a front face 124 of the front end 120 through a central opening 126 in the main body 110 and exiting out the rear end 122. The rear end 122 of the main body also has a rear face 128. The fiber optic ferrule 104 may also have guide pins 130 (see FIG. 2) and/or a guide pin clamp or spacer 132 disposed at the rear end 122. There may also be more than one central opening 126 through the fiber optic ferrule 104. For example, there may be two or more rows of optical fibers 114, optical fiber support structures 112 in the fiber optic ferrule 104. See FIG. 3.

The fiber optic ferrule push 102 also has a main body 150 that extends between a front end 152 and a rear end 154. The main body includes a central opening 156 that extends between the front end 152 and the rear end 154. The central opening 156 also receives the optical fibers 114 that are disposed in the fiber optic ferrule 104. The front end 152 of the main body 150 preferably has the same dimensions of the rear end 122 of the fiber optic ferrule 104. However, those dimensions of the main body 150 may be different from the fiber optic ferrule 104 as well. Since the optical fibers 114 are already in a ribbonized form, a height of the central opening 156 through which the ribbonized optical fibers 114 pass is preferably less than a width of the ribbon (in a transverse direction), at least at the front end 152, and possibly all throughout a length of the fiber optic ferrule push 114. Such a height prevents the fiber optic ferrule push 102 from being rotated relative to the ribbonized optical fibers 114 and fiber optic ferrule 104, for example, when inside the pulling grip, and even afterwards when the fiber optic ferrule 104 engages the fiber optic ferrule push 104. Preferably, the fiber optic ferrule push 102 is generally longer than the fiber optic ferrule 104 (i.e., in a longitudinal direction parallel to the optical fibers 114). Alternatively, the fiber optic ferrule push 102 may be of similar length as the fiber optic ferrule 104. Regardless of the length thereof, the fiber optic ferrule push 102 has substantially the same footprint as the fiber optic ferrule 104, as further discussed herein.

It will be appreciated that inside the pulling grip of the fiber optic cable bundle, only the fiber optic ferrule 104 (terminated with the ribbon of optical fibers 114) and the fiber optic ferrule push 102 exist. Of course, several of these two components—fiber optic ferrule 104 (terminated with the ribbon of optical fibers 114) and the fiber optic ferrule push 102 exist in an optimal spatial distribution inside the pulling sock to maximize the number of components. Alternatively, the pin clamp or spacer 132 may also be provided inside the pulling sock, but could be optional and added later after the fiber optic ferrule 104 and the fiber optic ferrule push 102 have been pulled out of the pulling sock.

The fiber optic ferrule push 102 includes a first alignment structure 160 on a top surface 162 of the main body 150. It may also be referred to as a "key" to one of ordinary skill in the art. The first alignment structure 160 is illustrated as a raised portion in the figures, but also take on other configurations. As discussed below, the first alignment structure 160 corresponds to a second alignment structure 216 in the housing 106 to ensure that the fiber optic assembly 100 is inserted in correct (only in one) orientation into the housing 106. If the fiber optic assembly 100 is inverted (rotated by 180°) relative to the housing 106, the key 160 will engage a portion of the housing 106, blocking the fiber optic assembly 100 from being inserted into the housing 106. The key 160 may take any shape or location on the fiber optic ferrule push 102. For example, the key 160 may also be on one of the side surfaces 166, which are on opposing sides of the top surface 162.

There may also be a window 168 extending through the top surface 162 and is in communication with the central opening 156 that forms a passageway for the optical fibers 114. This window 168 allows for access and/or visual inspection by a user to the optical fibers 114.

Figure 6:
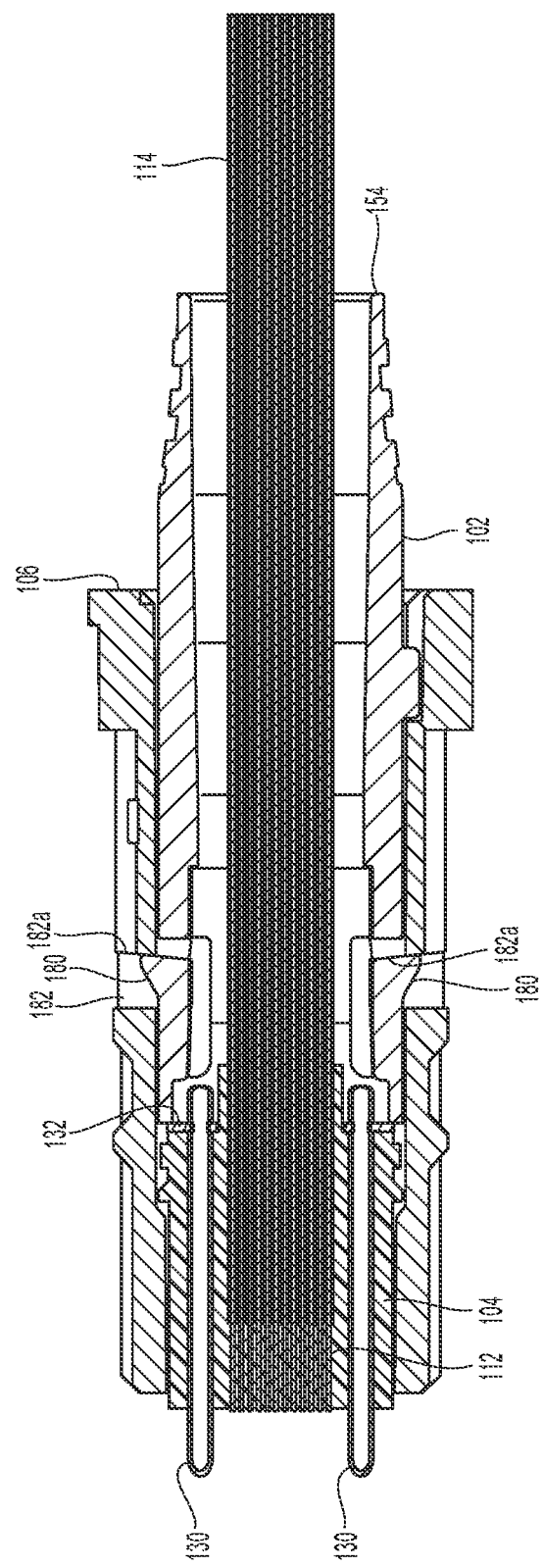
FIG. 6 is a top view of a cross section of the fiber optic assembly with the housing in FIG. 1.

The fiber optic ferrule push 102 has at least one projection 180 or latch that extends from the main body 150 to engage a corresponding structure 182 in the housing 106 (see FIG. 6). Preferably, there are two such projections 180, but only one may be necessary to retain the fiber optic ferrule push 102 within the housing 106. As illustrated in figures and perhaps best in FIG. 8, the projections 180 take the form of cantilevered arms, that include a front chamfered surface 184 and a rear facing flat surface 186. As the fiber optic assembly 100 (and the fiber optic ferrule push 102 in particular) is inserted into the housing 106, the front chamfered surface 184 engages the housing 106, causing the projection 180 to be flexed into a space 188 between the main body 150 and the projection 180, thereby allowing the fiber optic assembly 100 to be inserted into the housing 106. Once the fiber optic ferrule push 102 is inserted into the housing 106 a sufficient distance, the projection 180 will return to its initial position and the rear facing flat surface 186 will engage the structure 182 (a window or a cavity), which has a forward facing surface 182a in the housing 106 (see, FIG. 1). The fiber optic assembly 100 cannot be removed from the housing 106 until and unless the projection(s) 180 is removed from the structure 182. The projections 180 are toward the front end 152 of the fiber optic ferrule push 102, preferably in the front quarter thereof. It is also possible that the latch or projection(s) could be on the inside of the housing 106 and engage a cut-out, depression or other feature on the fiber optic ferrule push.

Figure 4:
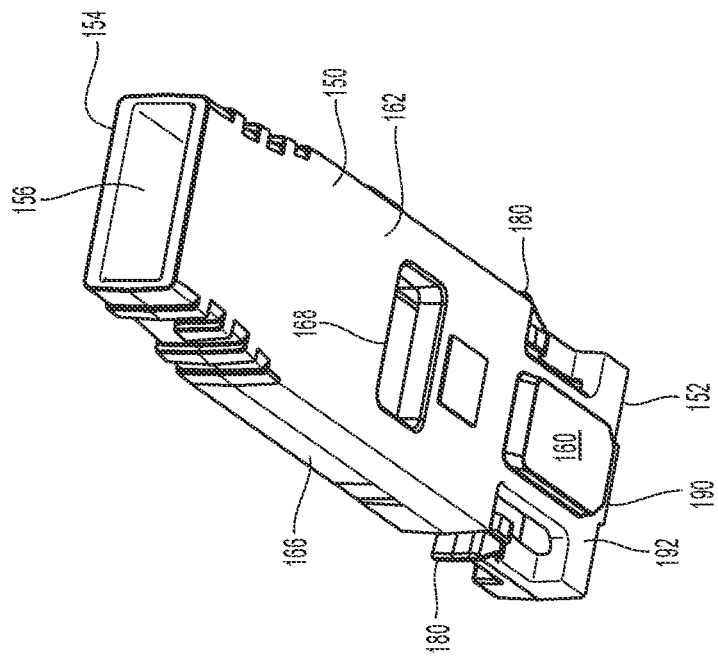
FIG. 4 is a front perspective view of the fiber optic ferrule push in FIG. 1.
Figure 5:
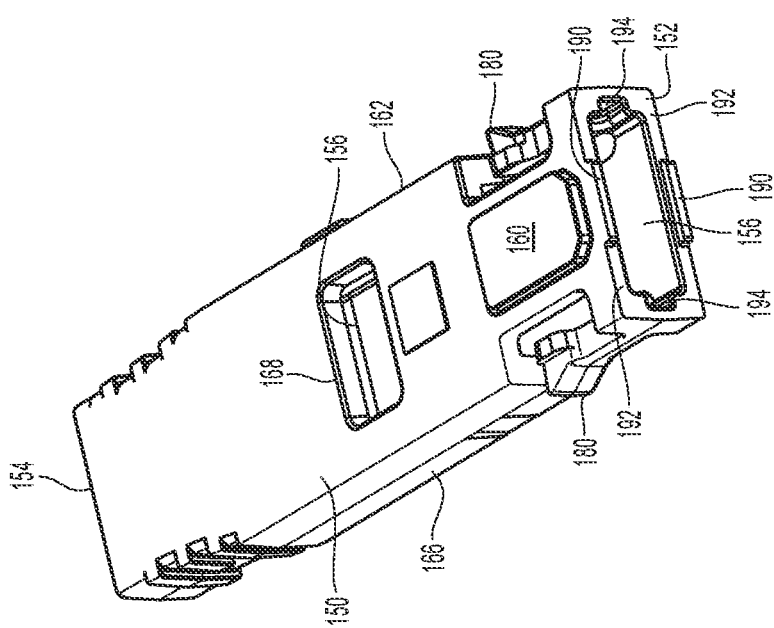
FIG. 5 is a rear perspective view of the fiber optic ferrule push in FIG. 1.
Figure 7:
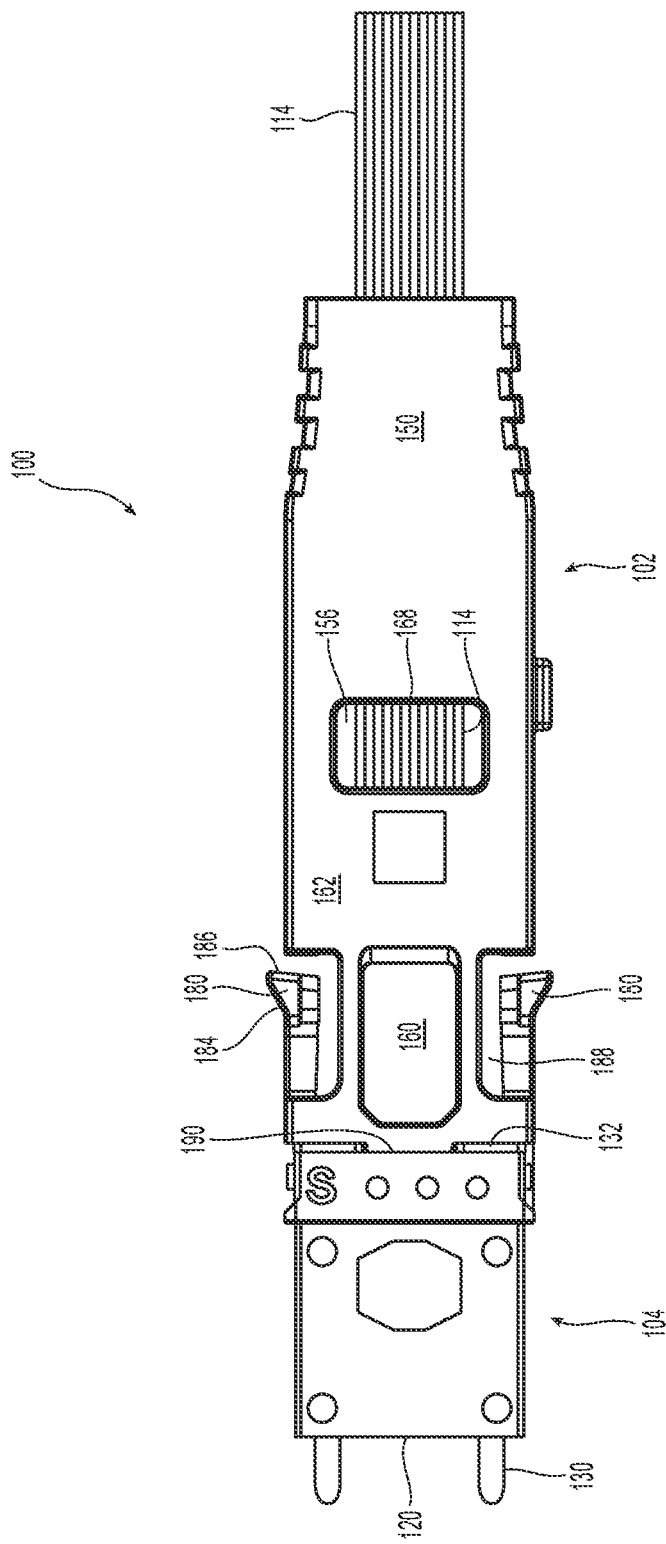
FIG. 7 is a top view of the fiber optic assembly in FIG. 1 without the housing.
Figure 8:
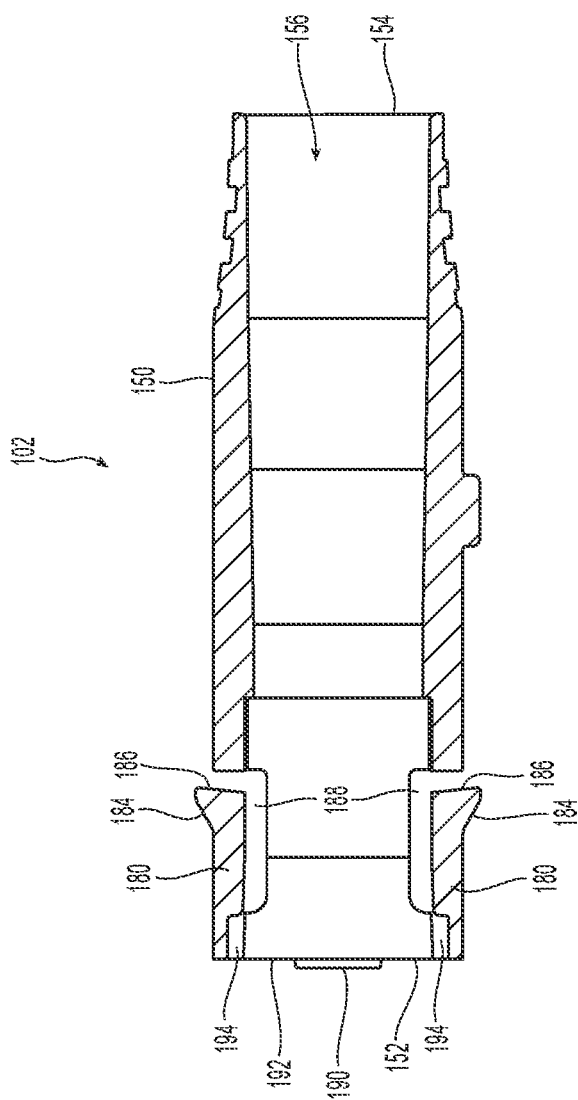
FIG. 8 is a top view of a cross section of the ferrule push in FIG. 1.

The front end 152 of the main body 150 is preferably configured to engage the rear end 122 of the fiber optic ferrule 104. The front end 152 preferably has at least two raised portions 190 (a forward facing surface) that extend from the front end 152 and away from the main body 150. As illustrated in FIGS. 4 and 7-8, the raised portions 190 are elongated in the center of each of the long sides 192. These locations correspond to one version of the guide pin clamp or spacer 132 and allow the raised portions 190 to directly engage the rear face 126 of the fiber optic ferrule 104. The raised portions 190 may be changed to correspond to a different version of a guide pin clamp or spacer. Additionally, the front end 152 may also engage the guide pin clamp or spacer directly which in turn engages the rear face 126 of the fiber optic ferrule 104. It is desired that the fiber optic ferrule push 102 engages the fiber optic ferrule 104 either directly or indirectly.

Alternatively, the raised portions 190 may instead be on the guide pin clamp 132 (albeit oppositely faced than when on the fiber optic ferrule push 102) to engage the front end thereof. Still alternatively, when the guide pin clamp 132 is not present, the fiber optic ferrule 104 may be modified to have the raised portions from the rear face 126 at the rear end 122 thereof. In any scenario, not all of the front end 152 of the fiber optic ferrule push 102 may engage or contact the guide pin clamp 132 and/or the rear face 126 of the fiber optic ferrule 104 directly or indirectly. In yet another variation, the raised portions 190 may not exist, and may be optional to the fiber optic assembly 100.

The front end 152 may also have two recessed portions or receptacle 194 to receive the rear ends of guide pins 130. The receptacle 194 is preferably in communication with the central opening 156 and formed at least in part by the front end 152. The central opening 156 may also have a ramped inner surface such that the central opening 156 is larger in cross section at the front end 152 than in a middle portion of the main body 150.

It was mentioned above that the front end 152 of the main body 150 preferably has the same dimensions of the rear end 122 of the fiber optic ferrule 104. In some embodiments, the fiber optic ferrule push 102 in general may have substantially the same cross-sectional footprint as the fiber optic ferrule 104. The term "footprint" as used in this disclosure refers to only height, only width, or both height and width of the component in question (e.g., fiber optic ferrule 104 and/or the fiber optic ferrule push 102) when viewed in a cross-sectional plane that is perpendicular to a longitudinal/lengthwise axis of the component. In some embodiments, the fiber optic ferrule push 102 (including the key 160, the projection(s) 180, and a rear boss/flange on a side of the fiber optic ferrule push 102) may protrude no further than or only slightly further than the footprint defined by the fiber optic ferrule 104 (specifically a flange/shoulder thereof). The footprint may, for example, be less than 10% larger than that defined by the fiber optic ferrule 104.

The housing 106 also includes, in addition to the rear end 108, a front end 200, and an opening 202 extending between the front end 200 and the rear end 108. See FIG. 1. The housing 106 also includes a key or alignment structure 210 on the outside surface 212. As with the key 160 above, the key 210 prevents the housing 106 from being inserted into an adapter in the wrong orientation. It is illustrated as a rectangular structure on a top surface 214, but it may take any shape or location on the housing 106 so as to prevent the housing 106 from being inserted incorrectly into an adapter. The housing 106 also has a second key or alignment structure 216 in the opening 202 that aligns with and receives the key 160 on the fiber optic ferrule 104. In this case, the key 216 is a groove in the top of the housing 106.

As best illustrated in FIG. 6, the fiber optic ferrule push 102 extends beyond the rear end 108 of the housing 106 in a rearward direction. Thus, a portion of the fiber optic ferrule push 102 is not covered by the housing 106. However, the front end 152 of the fiber optic ferrule push 102 covered by the housing 106.

Figure 9:
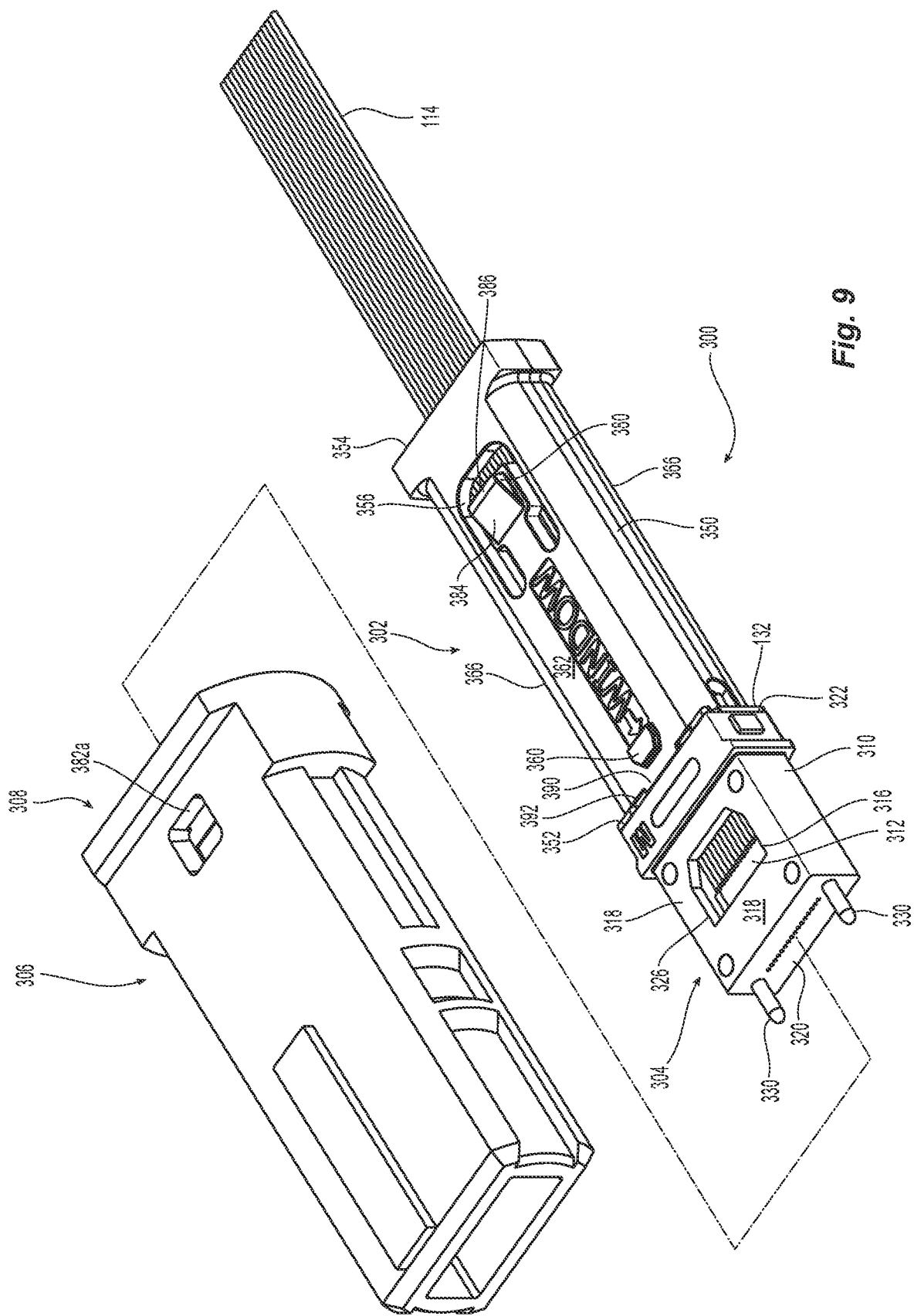
FIG. 9 is a perspective view of a second embodiment of fiber optic assembly according to the present invention.
Figure 10:
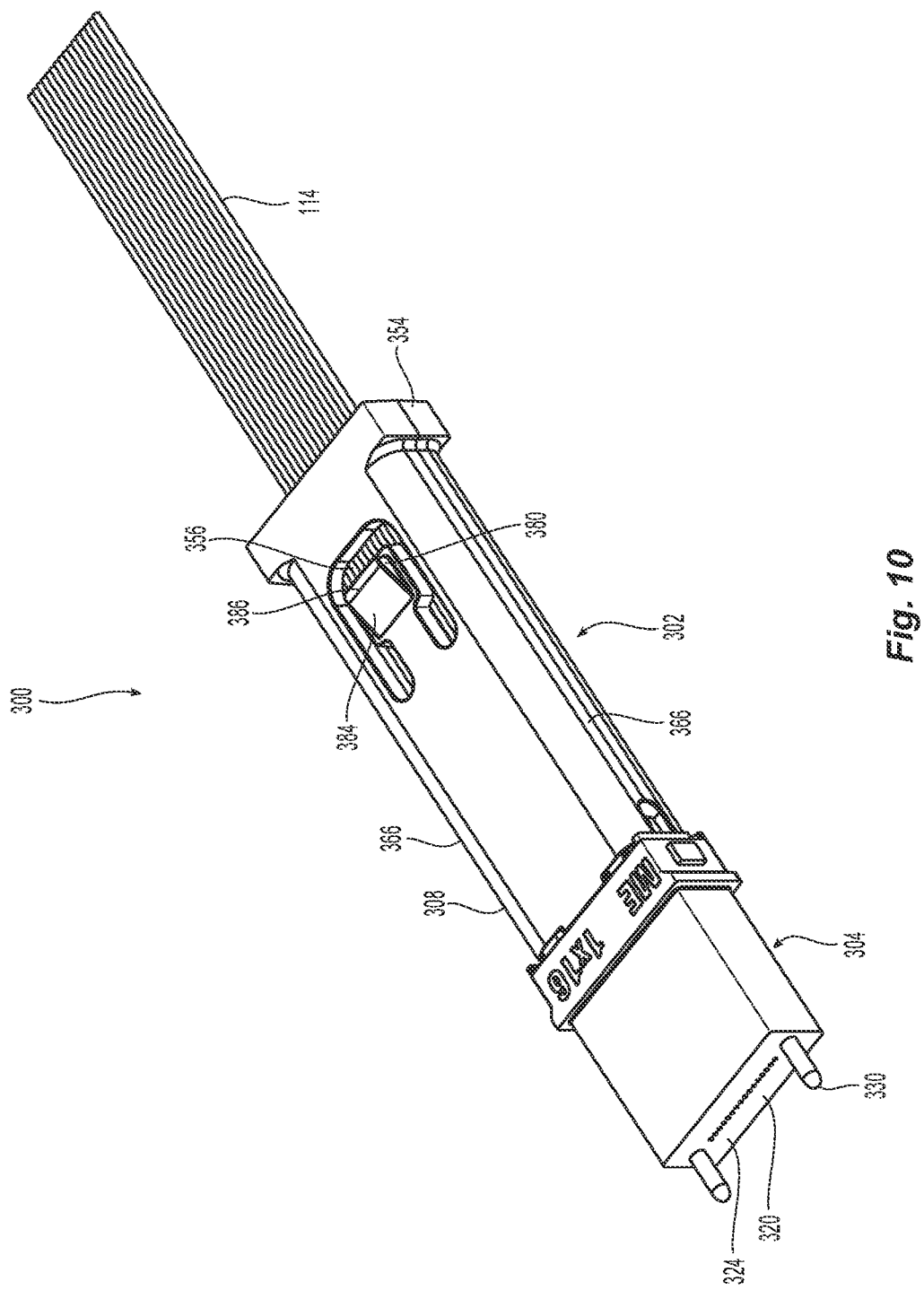
FIG. 10 is a bottom perspective view of the fiber optic assembly in FIG. 9 without the housing.

Another embodiment of a fiber optic assembly 300 is illustrated in FIGS. 9 and 10. The fiber optic assembly 300 has a fiber optic ferrule push 302 and a fiber optic ferrule 304. The fiber optic assembly 300 may also include the housing 306, illustrated in FIG. 9. The fiber optic ferrule push 302 and a fiber optic ferrule 304 may be inserted together into the housing 306 from a rear end 308.

The fiber optic ferrule 304 may also be an MT ferrule as described above or have another configuration and structure. However, the fiber optic ferrule 304 preferably has a main body 310 that includes a plurality of optical fiber support structures 312, which may be a plurality of micro-holes, v-grooves, or the like. The optical fiber support structures 312 support and hold the optical fibers 114 inserted into the fiber optic ferrule 304. The fiber optic ferrule 304 may also include a window 316 in a top surface 318 of the fiber optic ferrule 304 to assist with the alignment of the optical fibers 114 and to receive epoxy to secure the optical fibers 114 therein. The main body 310 extends between a front end 320 and a rear end 322, the optical fibers 114 extending from a front face 324 of the front end 320 through a central opening 326 in the main body 310 and exiting out the rear end 322. The fiber optic ferrule 304 may also have guide pins 330 (see FIG. 2) and/or a guide pin clamp or spacer 132 disposed at the rear end 322. There may also be more than one central opening 326 through the fiber optic ferrule 304. For example, there may be two or more rows of optical fibers 114, optical fiber support structures 312 in the fiber optic ferrule 304.

The fiber optic ferrule push 302 also has a main body 350 that extends between a front end 352 and a rear end 354. The main body 350 includes a central opening 356 that extends between the front end 352 and the rear end 354. The central opening 356 also receives the optical fibers 114 that are disposed in the fiber optic ferrule 304. The front end 352 of the main body 350 preferably has the same dimensions of the rear end 322 of the fiber optic ferrule 304. However, those dimensions of the main body 350 may be different from the fiber optic ferrule 304 as well. The fiber optic ferrule push 302 generally cannot rotate much relative to the optical fibers 114 and the fiber optic ferrule 304.

The fiber optic ferrule push 302 includes a first alignment structure 360 on a top surface 362 of the main body 350. It may also be referred to as a "key" to one of ordinary skill in the art. The first alignment structure 360 is illustrated as a raised portion in the figures, but also take on other configurations. As discussed below, the first alignment structure 360 corresponds to a second alignment structure (the same as 216 in FIG. 1) in the housing 306 to ensure that the fiber optic assembly 300 is inserted in correct (only in one) orientation into the housing 306. If the fiber optic assembly 300 is inverted or flipped by 180° relative to the housing 306, the key 360 will engage a portion of the housing 306, blocking the fiber optic assembly 300 from being inserted into the housing 306. The key 360 may take any shape or location on the fiber optic ferrule push 302. For example, the key may also be on one of the side surfaces 366, which are on opposing sides of the top surface 362.

The fiber optic ferrule push 302 has at least one projection 380 that extends from the main body 350 to engage a corresponding structure 382a in the housing 306. Preferably there are two such projections 380, one on the top and one on the bottom (see FIG. 10). However, only one may be necessary to retain the fiber optic ferrule push 302 within the housing 306. As illustrated in figures, the projections 380 take the form of cantilevered arms, that include a front chamfered surface 384 and a rear facing flat surface 386. As the fiber optic assembly 300 (and the fiber optic ferrule push 302 in particular) is inserted into the housing 306, the front chamfered surface 384 engages the housing 306, causing the projection 180 to be flexed into the central opening 356, thereby allowing the fiber optic assembly 300 to be inserted into the housing 306. Once the fiber optic ferrule push 302 is inserted into the housing 306 a sufficient distance, the projection 380 will return to its initial position and the rear facing flat surface 386 will engage the structure 382 (a window or a cavity), which has a forward facing surface 388. The fiber optic assembly 300 cannot be removed from the housing 306 until and unless the projection(s) 380 is removed from the structure 382. The projections 380 are toward the rear end 354 of the fiber optic ferrule push 302, preferably in the rear quarter thereof.

The front end 352 of the main body 350 is preferably configured to engage the rear end 322 of the fiber optic ferrule 304. The front end 352 preferably has at least two raised portions 390 that extend from the front end 352 and away from the main body 350. As in the prior embodiment, the raised portions 390 are elongated in the center of each of the long sides 392. These locations correspond to one version of the guide pin clamp or spacer 132 and allow the raised portions 390 to directly engage the rear end 322 of the fiber optic ferrule 304. The raised portions 390 may be changed to correspond to a different version of a guide pin clamp or spacer. Additionally, the front end 352 may also engage the guide pin clamp or spacer directly which in turn engages the rear end 322 of the fiber optic ferrule 304. It is desired that the fiber optic ferrule push 302 engages the fiber optic ferrule 304 either directly or indirectly.

Another embodiment of a fiber optic assembly 400 is illustrated in FIGS. 11-17. The fiber optic assembly 400 has a fiber optic ferrule push 402 and a fiber optic ferrule 404. The fiber optic assembly 400 may also include the housing 406, illustrated in FIG. 16. The fiber optic ferrule push 402 and a fiber optic ferrule 404 may be inserted together into the housing 406 from a rear end 408.

The fiber optic ferrule 404 may the same as in the prior embodiment, and only relevant structures will be described herein with respect to fiber optic ferrule 404. The fiber optic ferrule push 402 is a tool-less fiber optic ferrule push in that no tools are required to remove the fiber optic ferrule push 402 from the housing 406 as the first embodiment. In that embodiment, a tool would be needed to disengage the projections 480 from the housing 106. However, fiber optic ferrule push 402 can be removed by simply squeezing the rear end 454. For example, the ends of a shoulder 458 may be squeezed toward each other to reduce a central opening 456.

The fiber optic ferrule push 402 has a main body 450 that extends between a front end 452 and a rear end 454. The main body 450 includes the central opening 456 that extends between the front end 452 and the rear end 454. The central opening 456 also receives the optical fibers 114 that are disposed in the fiber optic ferrule 404. The height of the central opening 456 at the front end 452 is also preferably less than two times the diameter of the optical fibers 114 to also prevent the fiber optic ferrule push 402 from being rotated relative to the optical fibers 114 and fiber optic ferrule 404. The rear end 454 has an enlarged portion or shoulder 458, which allows for the user to more easily grasp the rear end 454. As illustrated in FIG. 17, the rear end 454 and the shoulder 458 extend beyond the rear end 408 of the housing 406 in a rearward direction The fiber optic ferrule push 402 has a top side 434 and a bottom side 436, which are separated by two side walls 466. In the top side 434 is a slot 438 that extends from the front end 452 to the rear end 454. The slot 438 is in communication with the central opening 456. The fiber optic ferrule push 402 also has at least one projection 480 that extends from the main body 450. While one projection 480 may be sufficient to retain the fiber optic ferrule push 402 in the housing 406, there are preferably two projections 480. In this embodiment, the projections 480 extend from the side walls 466 and are closer to the rear end 454 than the front end 452. In fact, the projections 480 are in the back quarter of the main body 450.

Figure 13:
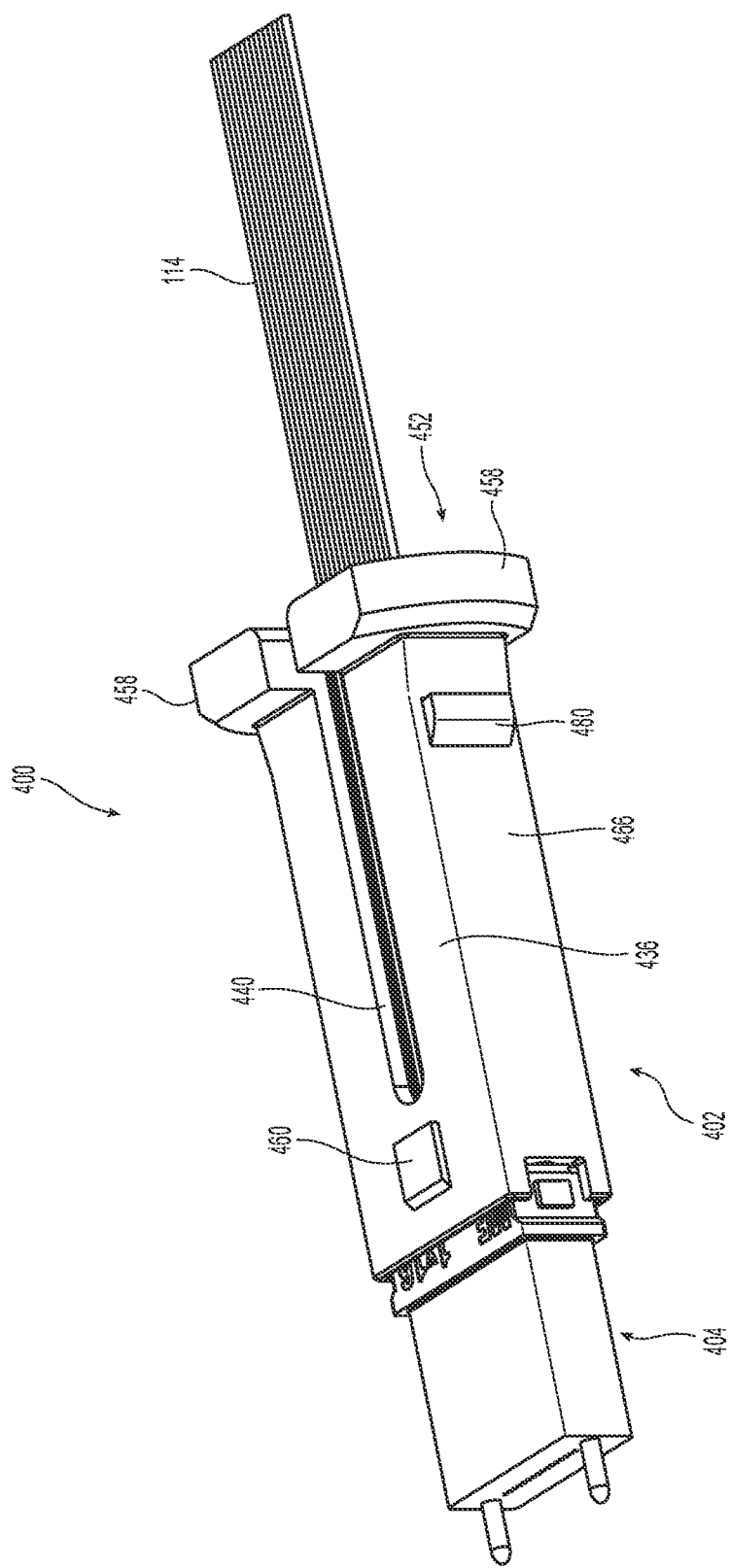
FIG. 13 is a bottom perspective view of the fiber optic assembly in FIG. 11.

The bottom side 436 of the fiber optic ferrule push 402 is illustrated in FIG. 13. There is a second slot 440 that extends from the rear end 454 towards the front end 452, but stops short thereof. The second slot 440 is also narrower than the slot 438 on the top side 434. The second slot 440 is also in communication with the central opening 456. The slot 438 and the second slot 440 cut the shoulder 458 into two sections. When a user presses the two sections of the shoulder 458 together, then the projections 480 are released from a corresponding structure (e.g., a window or a cavity) in the housing 406. Thus, no tools are needed to remove the fiber optic ferrule push 402. The slot 438 provides compliance or flexibility to the fiber optic ferrule push 402. In an alternative embodiment, the slot 438 may be optional.

The fiber optic ferrule push 402 includes a first alignment structure 460 on the bottom side 436 of the main body 450. It may also be referred to as a "key" to one of ordinary skill in the art. The first alignment structure 460 is illustrated as a raised portion in the figures, but may also take on other configurations and locations as noted above. The first alignment structure 460 corresponds to a second alignment structure 416 in the housing 406. See FIG. 16. If the first and second alignment structures do not align, then the fiber optic assembly 400 will not fit within the housing 406.

Figure 11:
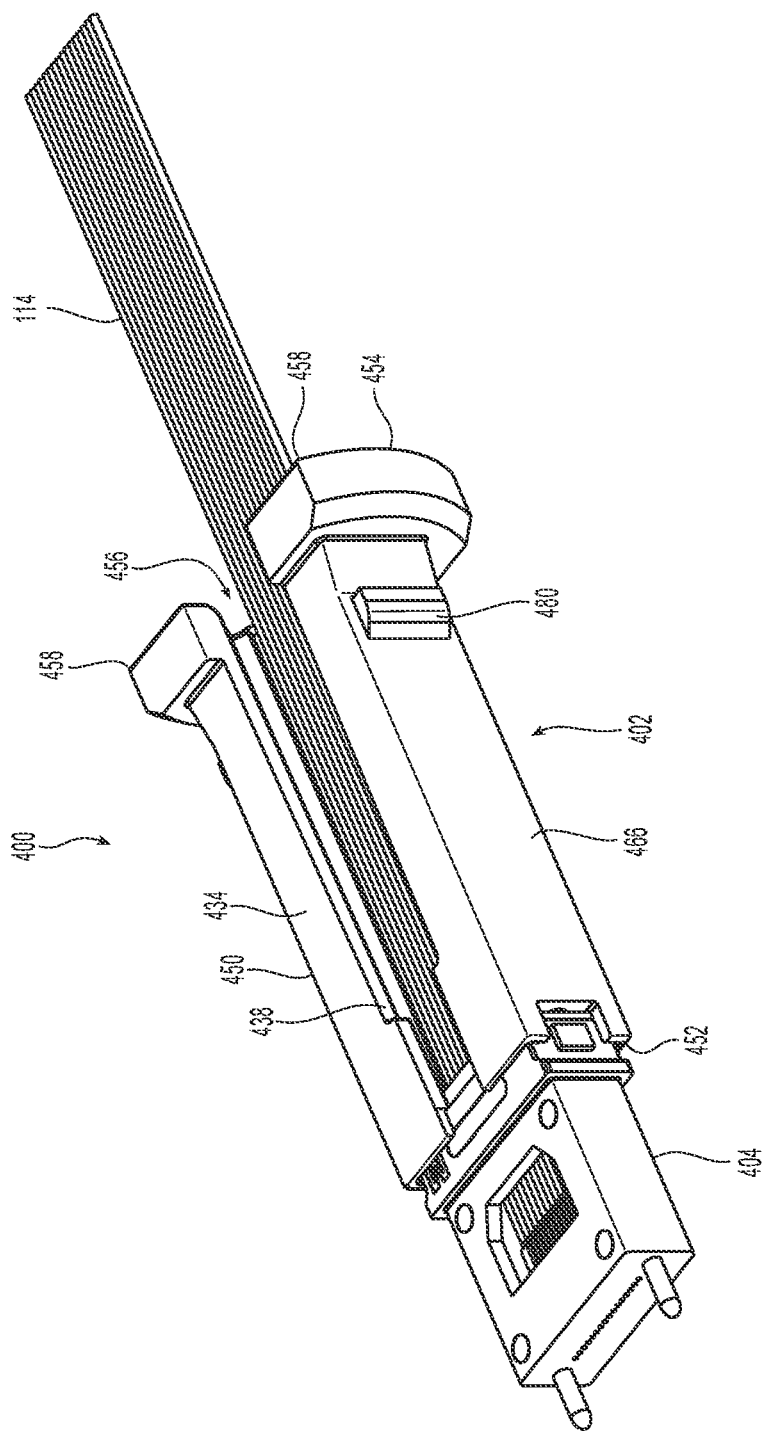
FIG. 11 is a perspective view of a third embodiment of a fiber optic assembly according to the present invention.
Figure 12:
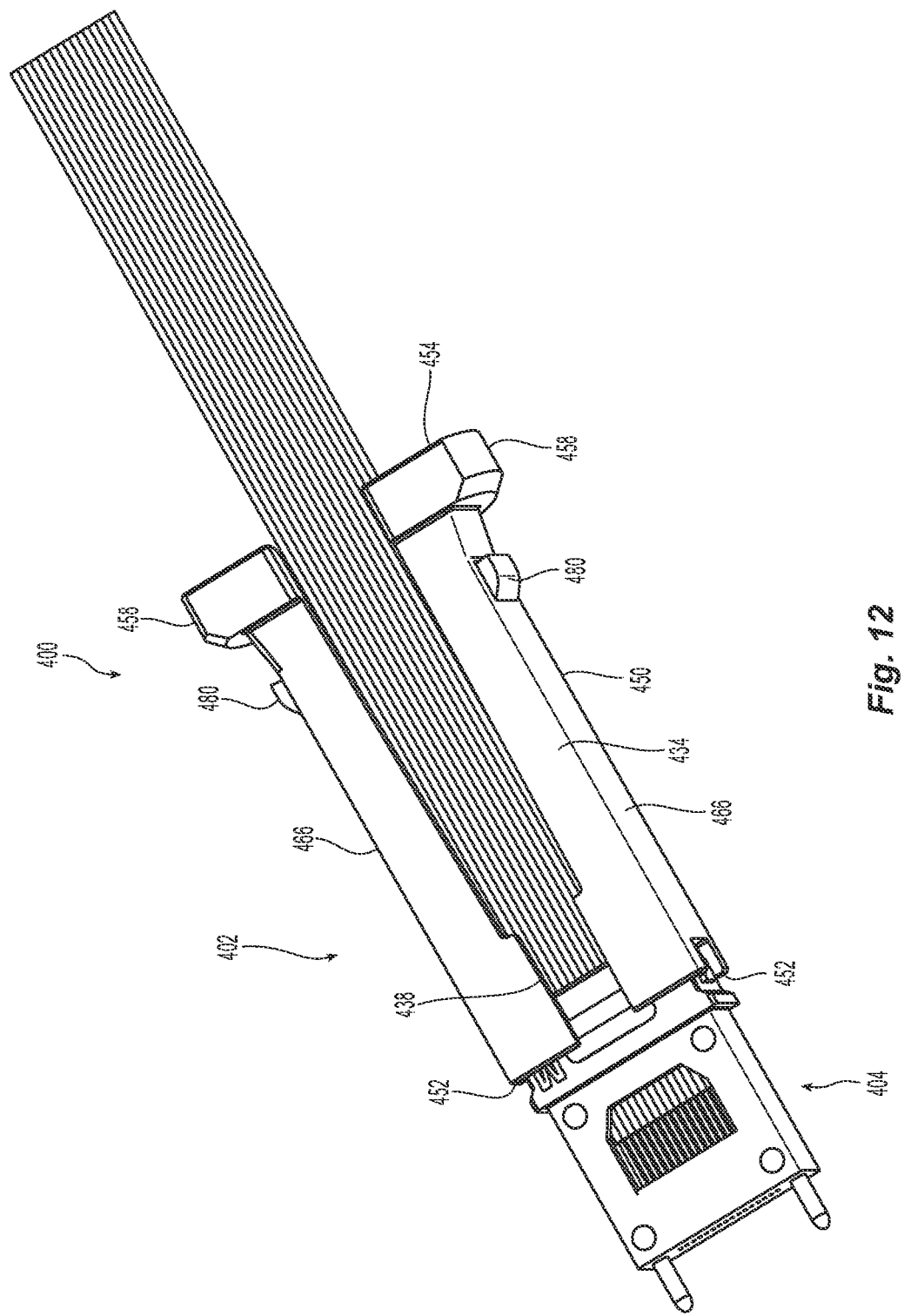
FIG. 12 is a top perspective view of the fiber optic assembly in FIG. 11.
Figure 14:
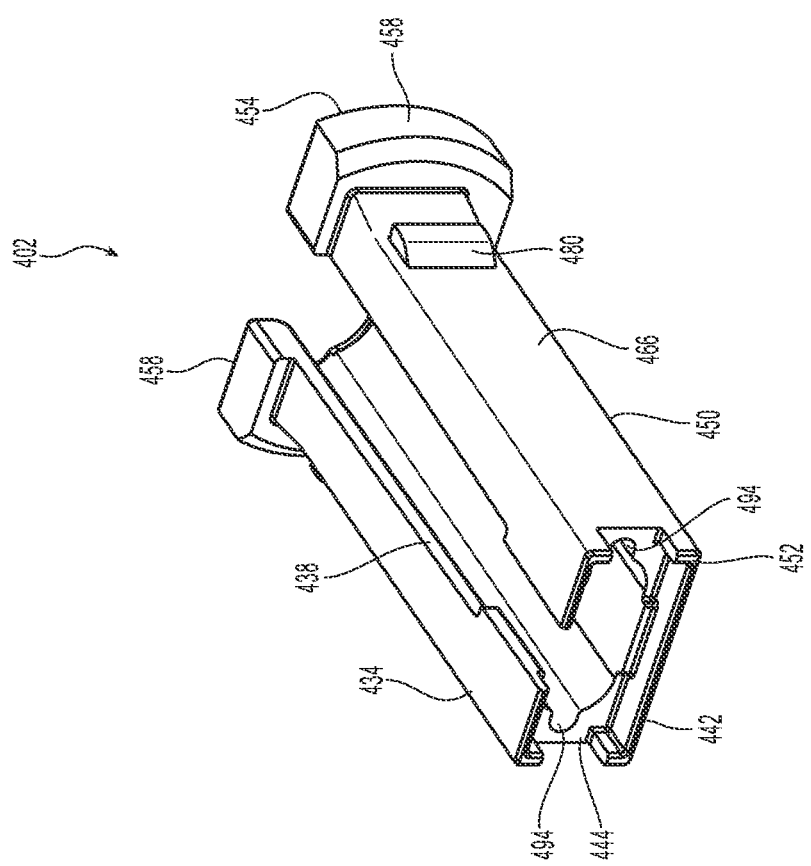
FIG. 14 is a front elevation view of the fiber optic ferrule push in FIG. 11.
Figure 16:
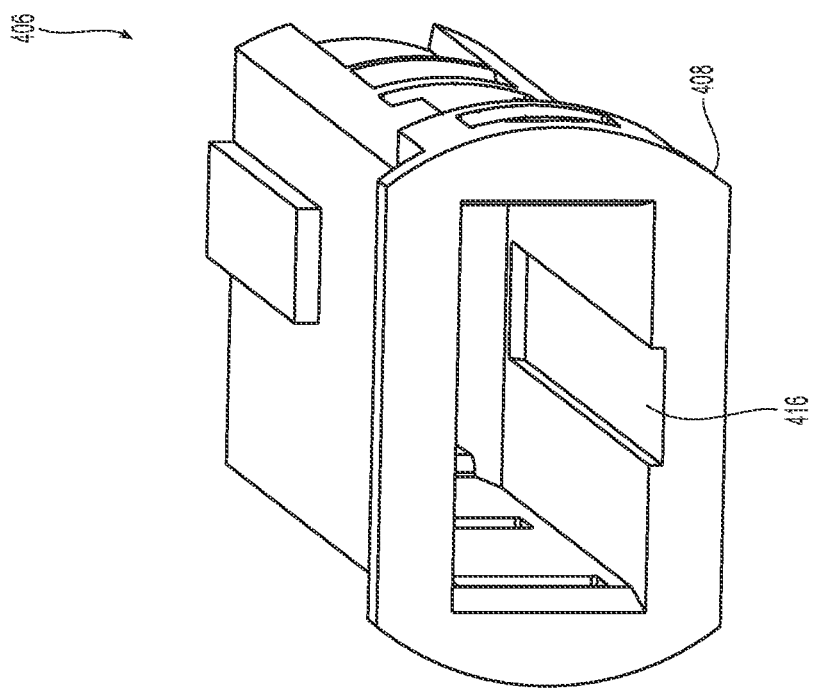
FIG. 16 is a rear perspective view of a housing for use with fiber optic assembly in FIG. 11.
Figure 15:
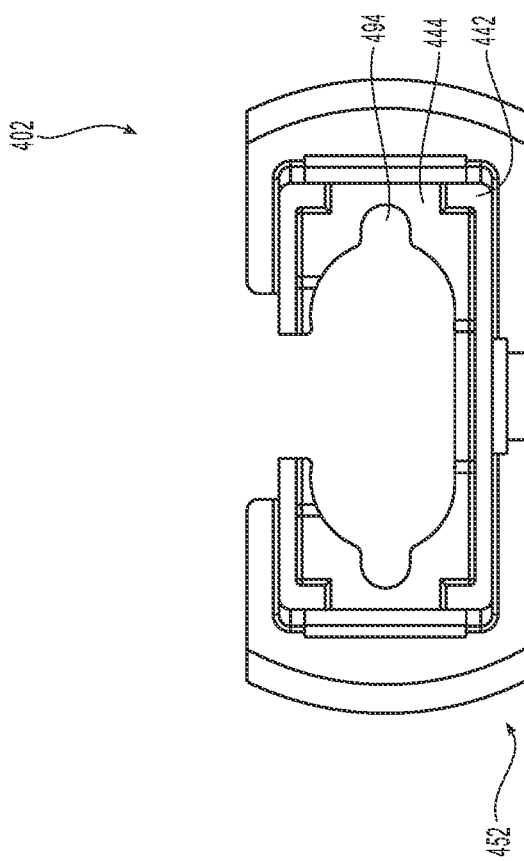
FIG. 15 is a front elevation view of the fiber optic ferrule push in FIG. 14.

Turning to FIGS. 14 and 15, the front end 452 will be discussed. The front end 452 has two different forward facing surfaces 442,444. The first forward facing surface 442 is farther forward than the second forward facing surface 444. The first forward facing surface 442 is generally smaller (thinner) and extends around the second forward facing surface 444. The first forward facing surface 442 may engage the rear facing portion of a fiber optic ferrule 404 as illustrated in FIG. 11. The second forward facing surface 444 may engage the rear face of the fiber optic ferrule 404. It is possible that both the first and the second forward facing surfaces 442,444 engage the fiber optic ferrule 404. The second forward facing surface 444 may also two recessed portions or receptacles 494 to receive the rear ends of guide pins. The receptacles 494 are preferably in communication with the central opening 456.

FIG. 17 illustrates fiber optic assembly 400 inserted into the housing 406, which may also have a slidable sleeve 498 that is placed around at least a portion of the housing 406. Similar to typical MPO connectors, the slidable sleeve 498 is movable or slidable relative to the housing 406. As illustrated, and similar to other embodiments, a portion of the fiber optic ferrule push 402 is outside the housing 406.

Figure 18:
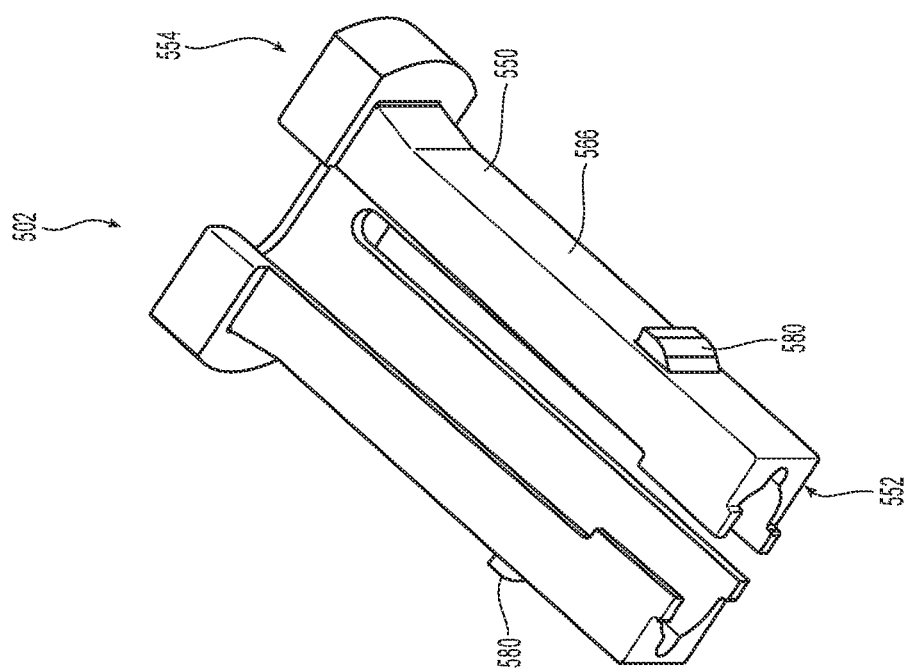
FIG. 18 a perspective view of a fourth embodiment of a fiber optic ferrule push according to the present invention.

Another embodiment of a fiber optic ferrule push 502 is illustrated in FIG. 18. In this embodiment, which is similar to that in FIGS. 11-17, the fiber optic ferrule push 502 has at least one projection 580 that extends from the main body 550. While one projection 580 may be sufficient to retain the fiber optic ferrule push 502 in the housing, there are preferably two projections 580. In this embodiment, the projections 580 extend from the side walls 566 and are closer to the front end 552 than the back end 554. In fact, the projections 580 are preferably in the front quarter of the main body 550.

Figure 19:
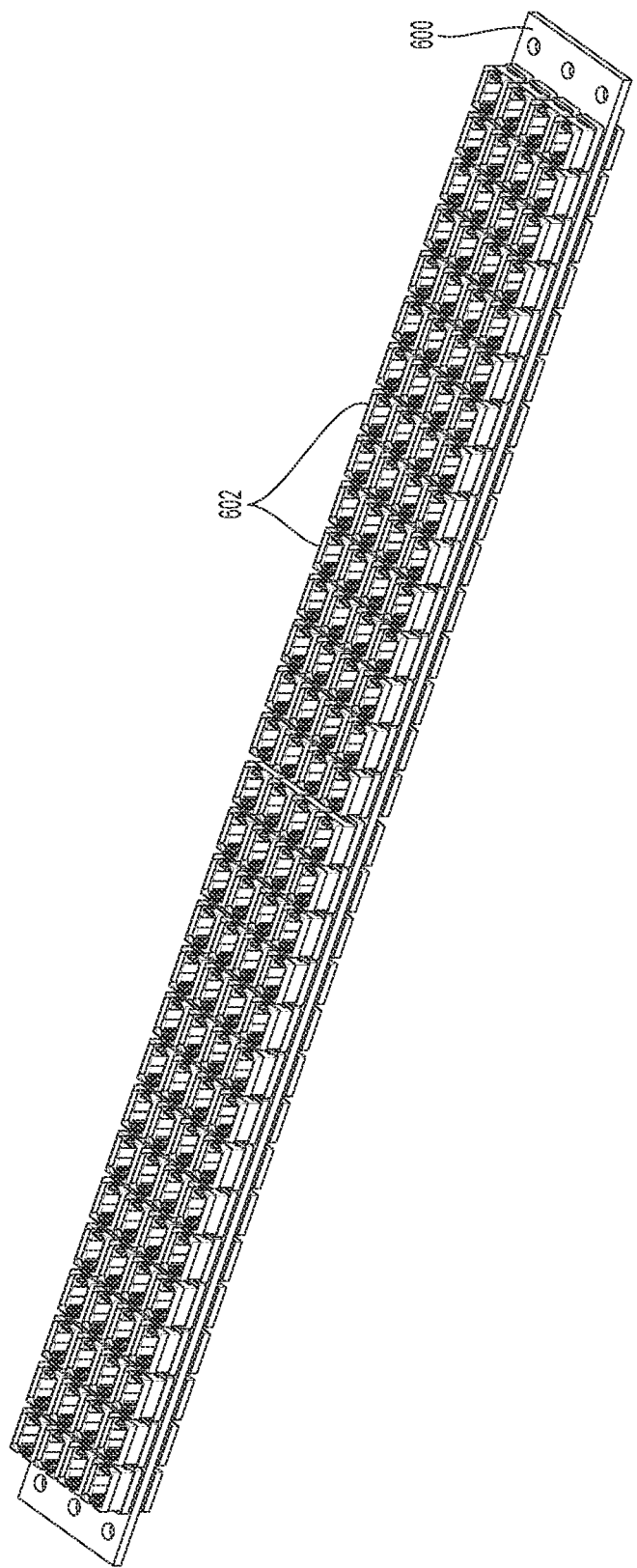
FIG. 19 a perspective view of an adapter panel that can receive the fiber optic assemblies according to the present invention.

FIG. 19 illustrates one embodiment of an adapter panel 600 that includes a plurality of adapters 602 that are installed in the adapter panel 600. The adapters 602 removably receive the housings (e.g., 106, 306, 406), which in turn receive the fiber optic assemblies, including the fiber optic ferrules (e.g., 104, 204, etc.). The fiber optic ferrule push may remain attached to the housing or may be removable from the fiber cable, e.g., in the embodiments shown in FIGS. 9-17 and 18. For example, the fiber optic ferrule push may slide back on the ribbonized optical fiber and simply rest thereupon when not in use.

As noted above, the size of the conduits through which the optical fibers pass, as well as the sizes of the pulling socks, are limited. Therefore, it is preferable to have the fiber optic connectors and components be as small as possible to allow for as many terminated optical fibers as possible within the pulling sock. Further, the various embodiments can reduce the number of components required in making an optical connection. One way to do this is to eliminate the outer housings (such as housings 106, 406, etc.) which take up a lot of volume, until the optical fibers have been passed through conduits. Such housings can thereafter be installed to complete the assembly of the optical connectors. As an alternative, it is possible for the housings to be pre-installed into adapters that are disposed within the adapter panel 602 (e.g., shown in FIG. 19). With the fiber optic assembly disclosed herein, it is possible to simply plug the fiber optic assemblies directly into the pre-installed housings on the adapters 602 to simultaneously complete installation optical connectors on the associated cable (ferrules and outer housings installed) and installation of the optical connectors in the adapters 602. The fiber optic assemblies are disposed within the housings from the rear thereof. See FIG. 1. Thus, once the fiber optic assemblies are removed from the pulling sock, they can be pushed into the housings using the fiber optic ferrule push (e.g., 102, 402, 502). Typical MPO connectors may be already provided on the opposite side of the adapters 602 that connect to various equipment inside a data center. This procedure of connecting fibers in the fiber optic ferrule eliminates the need to perform the fusion splicing of the optical fibers at the point where the fiber optic cable bundles from another data center enter a data center, and therefore the time and complexity of the installation needed to turn connect two data centers is reduced significantly. Since the fiber optic ferrule push has substantially the same footprint as the fiber optic ferrule inside the pulling sock, no significant changes to the pulling sock are required. Therefore, various embodiments of the fiber optic ferrule push as disclosed herein retroactively fit into the current pulling socks used in the field by the fiber optic connection industry. The housings could have a dust plug or some other structure to protect the inside portions of the housings from dust and debris. Similarly, the back side of the panel that has the adapters could also have dust plugs, to prevent dust and debris from fouling the faces of previously installed fiber optic assemblies. The fiber optic assembly disclosed herein may be provided as a bag of parts or a kit with the components shown in FIGS. 1-19. A cable assembly house or an end user at a data center may then use these components to achieve the setup shown herein.

Accordingly, various embodiments of the invention provide a method of connecting two or more data centers in an automated or "turn-key" manner, without requiring days or weeks of manual fusion splicing and minimal human labor. Since the components are manufactured to precision, errors due to human handling of fibers during splicing are also eliminated or substantially reduced. This method includes a step of connecting a fiber optic ferrule (e.g., the fiber optic ferrule 104) to an MPO connector by providing the fiber optic ferrule 104 in a pulling grip of a jacketed fiber optic cable. The fiber optic ferrule 104 has at least one optical fiber terminated therein. Preferably, the fiber optic ferrule 104 is a multi-fiber ferrule, although single fiber ferrules could also be used with a smaller fiber optic ferrule push than the one disclosed herein. The method includes installing the ferrule push at a back side of the fiber optic ferrule. The fiber optic ferrule push is generally free of the fiber optic ferrule, except when used to push the fiber optic ferrule. The method includes installing a housing (e.g., the housing 106) at least partially surrounding the fiber optic ferrule and the ferrule push, the housing being insertable into an adapter (e.g., one or more of the adapters 602) in a panel (e.g., the adapter panel 600.

To install the fiber optic ferrule to the pre-populated adapters 602, the method includes pulling the fiber optic ferrule out of the pulling grip, and pushing the ferrule into the housing using the fiber optic ferrule push after said pulling.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A fiber optic assembly comprising:
    a fiber optic ferrule push including:
        a main body extending between a front end and a rear end, the main body having a central opening extending between the front end and the rear end to receive a plurality of optical fibers therethrough;
        a latch disposed on one of a housing and the main body, the latch to engage a surface on the other of the housing and the main body;
        a first alignment structure to engage a corresponding second alignment structure on the housing to align the fiber optic ferrule push to the housing; and
        a front facing surface at the front end of the main body configured to push on a rear surface of a fiber optic ferrule; and
    the fiber optic ferrule including:
        a main body having a plurality of optical fiber support structures to receive the plurality of optical fibers; and
        a rear end having an opening to receive the plurality of optical fibers as a ribbon.

2. The fiber optic assembly according to claim 1, wherein the housing comprises a main body extending between a front end and a rear end and having an opening extending between the front end and the rear end to receive at least a portion of the fiber optic ferrule push and the fiber optic ferrule.

3. The fiber optic assembly according to claim 2, wherein the fiber optic ferrule and fiber optic ferrule push are inserted into the housing from the rear end of the housing.

4. The fiber optic assembly according to claim 2, wherein the fiber optic ferrule push extends beyond the rear end of the housing and the fiber optic ferrule extends beyond the front end of the housing.

5. The fiber optic assembly according to claim 2, further comprising:
    an adapter panel having a plurality of adapters, wherein an adapter in the plurality of adapters is coupled to the housing to removably receive the fiber optic ferrule.

6. The fiber optic assembly according to claim 2, further comprising a window in the ferrule push that is in communication with the opening in the rear end and the plurality of optical fiber support structures.

7. The fiber optic assembly according to claim 1, wherein the fiber optic ferrule push has a ramped inner surface such that the opening at the front end of the housing is larger in cross section than in a middle portion of the housing.

8. The fiber optic assembly according to claim 1, wherein a height of the central opening of the ferrule push is less than a width of the ribbon.

9. A fiber optic assembly comprising:
    a fiber optic ferrule push; and
    a fiber optic ferrule,
    wherein the fiber optic ferrule push further comprises a main body extending between a front end and a rear end, the main body having a central opening extending between the front end and the rear end to receive a plurality of optical fibers therethrough;
        a latch disposed on one of a housing and the main body, the latch to engage a surface on the other of the housing and the main body;
        a first alignment structure to engage a corresponding second alignment structure on the housing to align the fiber optic ferrule push to the housing; and
        a front facing surface configured to directly engage a fiber optic ferrule in operation to transfer a forward force to the fiber optic ferrule; and
    wherein the fiber optic ferrule further comprises:
        a main body having a plurality of optical fiber support structures to receive the plurality of optical fibers; and
        a rear end having an opening to receive the plurality of optical fibers as a ribbon.

10. The fiber optic assembly according to claim 9, wherein the front facing surface engages a rear surface of the fiber optic ferrule directly.

11. The fiber optic assembly according to claim 9, wherein the fiber optic ferrule push engages a rear surface of the fiber optic ferrule indirectly.

12. The fiber optic assembly according to claim 9, wherein there is a pin clamp between the fiber optic ferrule push and the fiber optic ferrule.

13. The fiber optic assembly according to claim 11, wherein the front facing surface engages the rear facing surface indirectly via a pin clamp.

* * * * *